United States Patent
Gill

(10) Patent No.: US 10,858,944 B2
(45) Date of Patent: Dec. 8, 2020

(54) METHOD OF MANUFACTURING A FAN BLADE AND A FAN BLADE

(71) Applicant: ROLLS-ROYCE plc, London (GB)

(72) Inventor: Vincent Gill, Bristol (GB)

(73) Assignee: ROLLS-ROYCE plc, London (GB)

( * ) Notice: Subject to any disclaimer, the term of this patent is extended or adjusted under 35 U.S.C. 154(b) by 1 day.

(21) Appl. No.: 16/277,494

(22) Filed: Feb. 15, 2019

(65) Prior Publication Data

US 2020/0024958 A1    Jan. 23, 2020

(30) Foreign Application Priority Data

Mar. 9, 2018  (GB) .................................. 1803802.6
Apr. 4, 2018  (GB) .................................. 1805546.7
Apr. 4, 2018  (GB) .................................. 1805547.5

(51) Int. Cl.
*F01D 5/14*     (2006.01)
*F01D 5/28*     (2006.01)
(Continued)

(52) U.S. Cl.
CPC ............. *F01D 5/147* (2013.01); *F01D 5/282* (2013.01); *B29C 70/081* (2013.01); *B29C 70/12* (2013.01); *B29C 70/30* (2013.01); *B29C 70/345* (2013.01); *B29C 70/36* (2013.01); *B29C 70/54* (2013.01); *B29C 70/682* (2013.01); *B29C 70/70* (2013.01); *B29D 99/0025* (2013.01); *B29L 2031/08* (2013.01); *B29L 2031/082* (2013.01); *B32B 1/00* (2013.01); *B32B 5/06* (2013.01); *B32B 5/26* (2013.01); *B32B 38/0012* (2013.01);
(Continued)

(58) Field of Classification Search
CPC ................................. F01D 5/147; F01D 5/282
See application file for complete search history.

(56) References Cited

U.S. PATENT DOCUMENTS 2,859,936 A    11/1958   Warnken
3,132,841 A    5/1964    Wilder
(Continued)

FOREIGN PATENT DOCUMENTS

EP    0 465 169 A1    1/1992
EP    1 930 548 A2    6/2008
(Continued)

OTHER PUBLICATIONS

Aug. 14, 2019 Search Report issued in European Patent Application No. 19157125.
(Continued)

*Primary Examiner* — Eldon T Brockman
(74) *Attorney, Agent, or Firm* — Oliff PLC

(57) ABSTRACT

There is disclosed a method of manufacturing a fan blade for a gas turbine engine, the method comprising: providing a root insert comprising quasi-isotropic short fibre reinforced resin, providing a first sub-laminate of a fibre-reinforcement pre-form for the fan blade on a first mould surface, placing the root insert on the first sub-laminate at a position corresponding to a root of the fan blade, providing a second sub-laminate of the pre-form over the root insert and the first-sub-laminate, so that the root insert is at an intermediate position between the first and second sub-laminates; and applying heat and pressure to form the pre-form.

19 Claims, 6 Drawing Sheets

(51) Int. Cl.

| | | |
|---|---|---|
| B29C 70/36 | (2006.01) | |
| B29C 70/54 | (2006.01) | |
| B29C 70/70 | (2006.01) | |
| B29L 31/08 | (2006.01) | |
| B32B 1/00 | (2006.01) | |
| B32B 5/06 | (2006.01) | |
| B32B 5/26 | (2006.01) | |
| B32B 38/00 | (2006.01) | |
| B32B 38/18 | (2006.01) | |
| B29C 70/08 | (2006.01) | |
| B29C 70/12 | (2006.01) | |
| B29C 70/34 | (2006.01) | |
| B29C 70/68 | (2006.01) | |
| B29D 99/00 | (2010.01) | |
| B29C 70/30 | (2006.01) | |

(52) U.S. Cl.
CPC ....... *B32B 38/1808* (2013.01); *B32B 2250/20* (2013.01); *B32B 2255/02* (2013.01); *B32B 2255/26* (2013.01); *B32B 2305/076* (2013.01); *B32B 2603/00* (2013.01); *F05D 2220/32* (2013.01); *F05D 2230/40* (2013.01); *F05D 2300/44* (2013.01); *F05D 2300/603* (2013.01); *F05D 2300/6034* (2013.01); *F05D 2300/611* (2013.01)

(56) References Cited

U.S. PATENT DOCUMENTS

| | | | |
|---|---|---|---|
| 3,487,879 | A | 1/1970 | McCarthy et al. |
| 3,873,654 | A | 3/1975 | Smith |
| 4,031,601 | A | 6/1977 | Staub et al. |
| 4,949,921 | A | 8/1990 | Jarmon et al. |
| 5,240,377 | A | 8/1993 | Farr |
| 5,279,892 | A | 1/1994 | Baldwin et al. |
| 5,403,153 | A | 4/1995 | Goetze |
| 8,109,734 | B2* | 2/2012 | Backhouse ............ F01D 5/147 244/123.1 |
| 2008/0260536 | A1 | 10/2008 | Beckford et al. |
| 2009/0232647 | A1 | 9/2009 | Henkle et al. |
| 2009/0246446 | A1* | 10/2009 | Backhouse ............ F01D 5/147 428/76 |
| 2011/0038732 | A1 | 2/2011 | Huth et al. |
| 2012/0171044 | A1 | 7/2012 | Berard et al. |
| 2012/0230829 | A1 | 9/2012 | Benkler et al. |
| 2016/0032939 | A1 | 2/2016 | Anderson et al. |
| 2018/0036914 | A1 | 2/2018 | Marsal et al. |
| 2018/0304562 | A1* | 10/2018 | Murakami ............ B29C 70/54 |

FOREIGN PATENT DOCUMENTS

| | | |
|---|---|---|
| EP | 2 105 579 A2 | 9/2009 |
| EP | 2 159 374 A2 | 3/2010 |
| EP | 2 327 538 A2 | 6/2011 |
| EP | 3 332 948 A1 | 6/2018 |
| GB | 775816 A | 5/1957 |
| GB | 871 066 A | 6/1961 |
| GB | 1 302 857 A | 1/1973 |
| GB | 2119303 A | 11/1983 |
| GB | 2 244 453 A | 12/1991 |
| GB | 2 262 315 A | 6/1993 |
| GB | 2 410 458 A | 8/2005 |
| WO | 2015/047511 A2 | 4/2015 |
| WO | 2017/126159 A1 | 7/2017 |

OTHER PUBLICATIONS

Aug. 23, 2019 Search Report issued in European Patent Application No. 19157127.2.
Aug. 23, 2019 Search Report issued in European Patent Application No. 19157128.0.
U.S. Appl. No. 16/277,402, filed Feb. 15, 2019 in the name of Backhouse et al.
U.S. Appl. No. 16/277,420, filed Feb. 15, 2019 in the name of Gill.
Sep. 27, 2018 Search Report issued in British Patent Application No. 1805546.7.
Oct. 4, 2018 Search Report issued in British Patent Application No. 1805547.5.
Sep. 10, 2018 Search Report issued in British Patent Application No. 1803802.6.

* cited by examiner

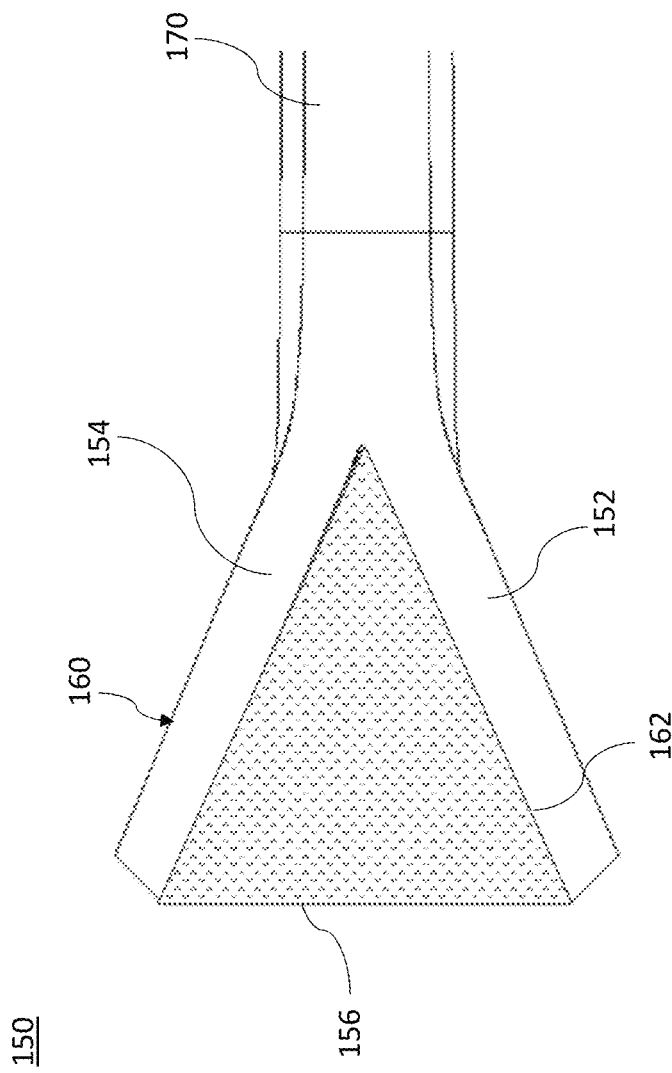

METHOD OF MANUFACTURING A FAN BLADE AND A FAN BLADE

CROSS-REFERENCE TO RELATED APPLICATIONS

This specification is based upon and claims the benefit of priority from UK Patent Application Number 1803802.6 filed on 9 Mar. 2018, and UK Patent Application Number 1805547.5 filed on 4 Apr. 2018, the entire contents of which are incorporated herein by reference.

BACKGROUND

Field of the Disclosure

The invention relates to a method of manufacturing a fan blade for a gas turbine engine, and a fan blade for a gas turbine engine.

Description of the Related Art

It is known to provide fan blades comprising fibre reinforced composite materials for gas turbine engines. Such composite materials can provide a lightweight and strong fan blade structure. However, manufacturing such fan blades by known lay-up procedures can be time consuming and expensive.

SUMMARY

According to a first aspect, there is provided a method of manufacturing a fan blade for a gas turbine engine, the method comprising: providing a near net shape root insert comprising non-laminated fibre reinforced composite; providing a first sub-laminate of a fibre-reinforcement pre-form for the fan blade on a first mould surface; placing the root insert on the first sub-laminate at a position corresponding to a root of the fan blade; providing a second sub-laminate of the pre-form over the root insert and the first-sub-laminate, so that the root insert is at an intermediate position between the first and second sub-laminates; and applying heat and pressure to form and cure the pre-form.

The expression near net shape root insert is intended to mean a root insert having a shape close to final shape of the root insert in the formed fan blade.

A non-laminated fibre reinforced composite is fibre reinforcement material within a matrix material such as a resin, where the fibre reinforcement material has been arranged to form a bulk body (i.e. a three-dimensional body, in other words a non-planar or non-sheet body) without using a laminate structure. Examples are set out below. Non-laminated structures may be more efficiently manufactured than laminated structures, but may have poorer structural properties than laminated structures comprising unidirectional fibre reinforcement.

The root insert may be formed by compression moulding quasi-isotropic short fibre reinforced resin. For example, the term "short" may refer to fibres between ¼ and 2 inches in length. The root insert may be formed by pultrusion of a bundle of fibres. The pultruded bundle of fibres may be deformed from a linear pultruded shape to a non-linear shape of the root insert before placing. The root insert may be formed by weaving a plurality of fibres. The root insert may be wedge shaped.

Providing the first sub-laminate may comprise laying up of plies of fibre reinforcement material on the first mould surface. Providing the second sub-laminate may comprise laying up of plies of fibre reinforcement material over the root insert and the first sub-laminate.

The first sub-laminate and the second sub-laminate may be provided with a substantially constant thickness along a longitudinal extent of the pre-form.

The root insert and first and second sub-laminates may be sized and positioned in the layup, such that the first sub-laminate and second sub-laminate each define at least 50% of the total root thickness through the root of the fan blade.

The pre-form may be compression moulded.

The method may comprise providing more than one root insert comprising non-laminated fibre reinforced composite. The more than one root insert may be separated in the pre-form by further sub-laminate layers.

The root insert may be un-cured or partially cured when placed on the first sub-laminate. The root insert may be fully cured together with the first and second sub-laminates. In other examples, the root insert may be fully cured when placed on the first sub-laminate.

According to a second aspect, there is provided a fan blade for a gas turbine engine, comprising a root insert sandwiched between a first and second sub-laminate, within the root of the fan blade, wherein the root insert comprises non-laminated fibre reinforced composite, and wherein the first and second sub-laminates each comprise laminated fibre reinforced composite. The root insert may be manufactured by a method in accordance with the first aspect.

The root insert may comprise quasi-isotropic short fibre reinforced resin. The root insert may comprise a woven pattern of fibre reinforcement material. The root insert may comprise a bundle of coextensive fibres in a resin matrix. The root insert may define a wedge shape.

The first and second sub-laminates may each have a substantially constant thickness along a longitudinal extent.

An interface between the root insert and sub-laminates may define a frangible delamination location at which the fan blade is configured to preferentially in a failure event.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. A higher gear ratio may be more suited to "planetary" style gearbox. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 230 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being Jkg-1K-1/(ms-1)2). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1 s, 105 Nkg-1 s, 100 Nkg-1 s, 95 Nkg-1 s, 90 Nkg-1 s, 85 Nkg-1 s or 80 Nkg-1 s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disk or a bladed ring. Any suitable method may be used to manufacture such a bladed disk or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24, or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIG. 7 schematically shows a root and blade portion of an example fan blade manufactured with the method of FIG. 5.

DETAILED DESCRIPTION OF THE DISCLOSURE

Figure 1:
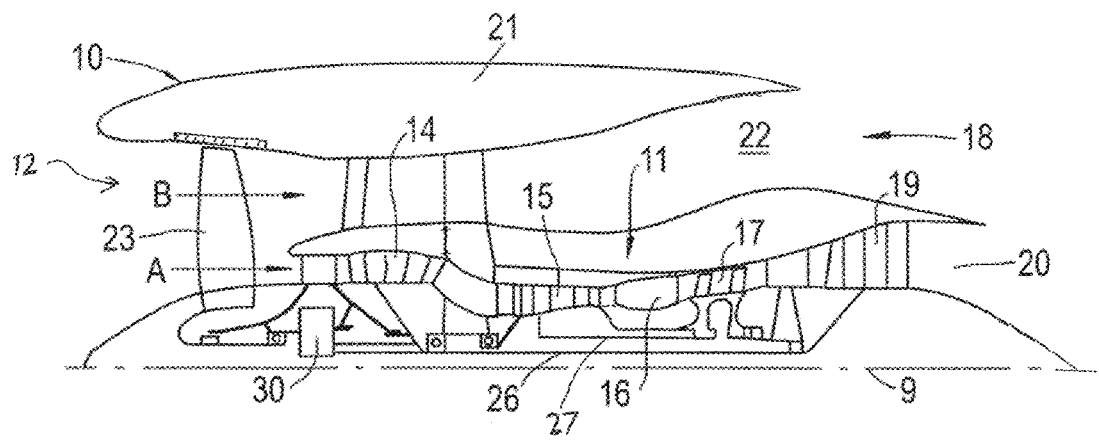
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
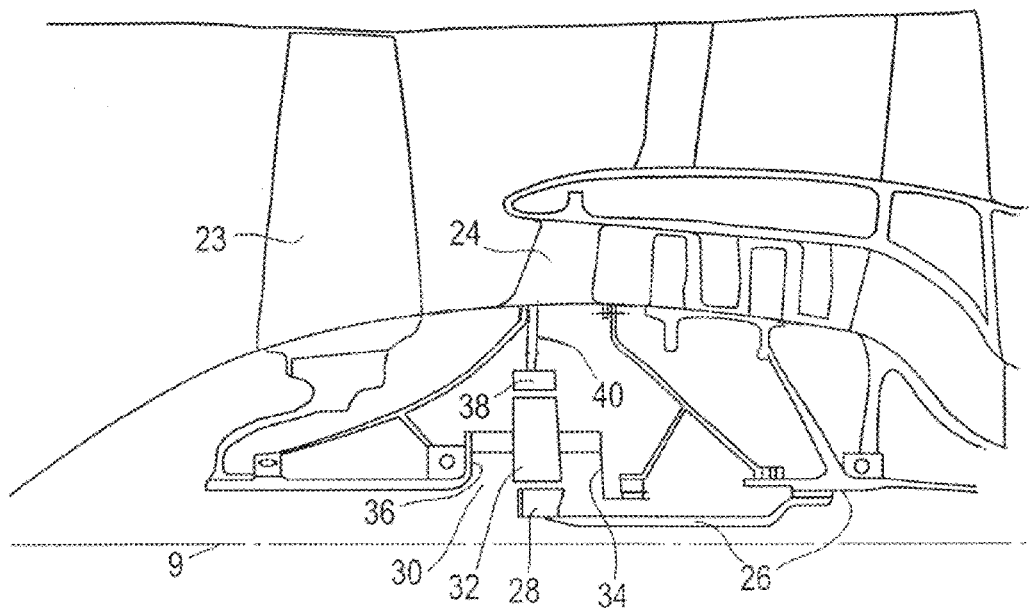
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
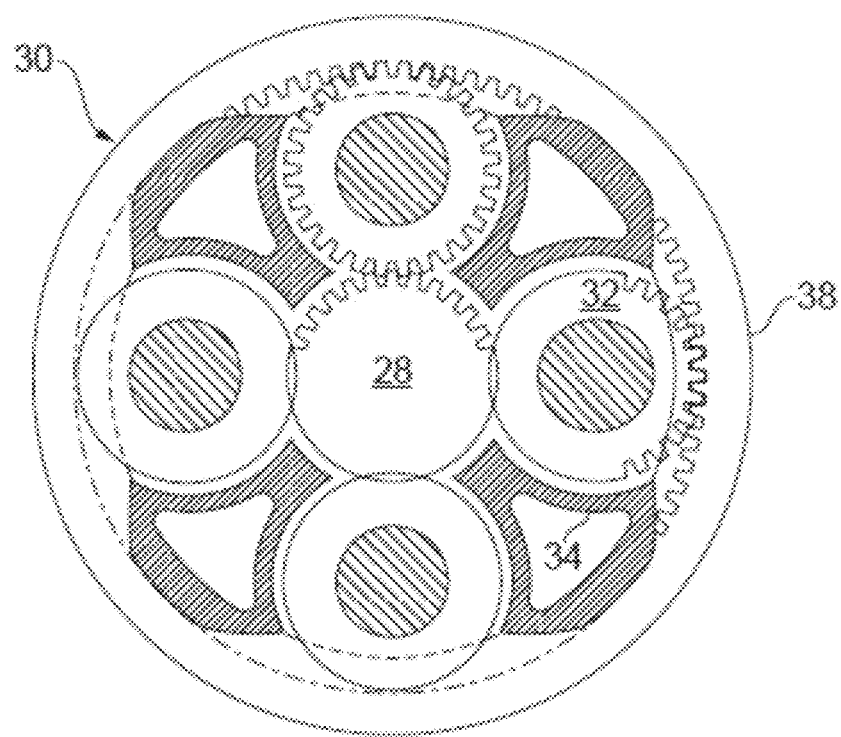
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
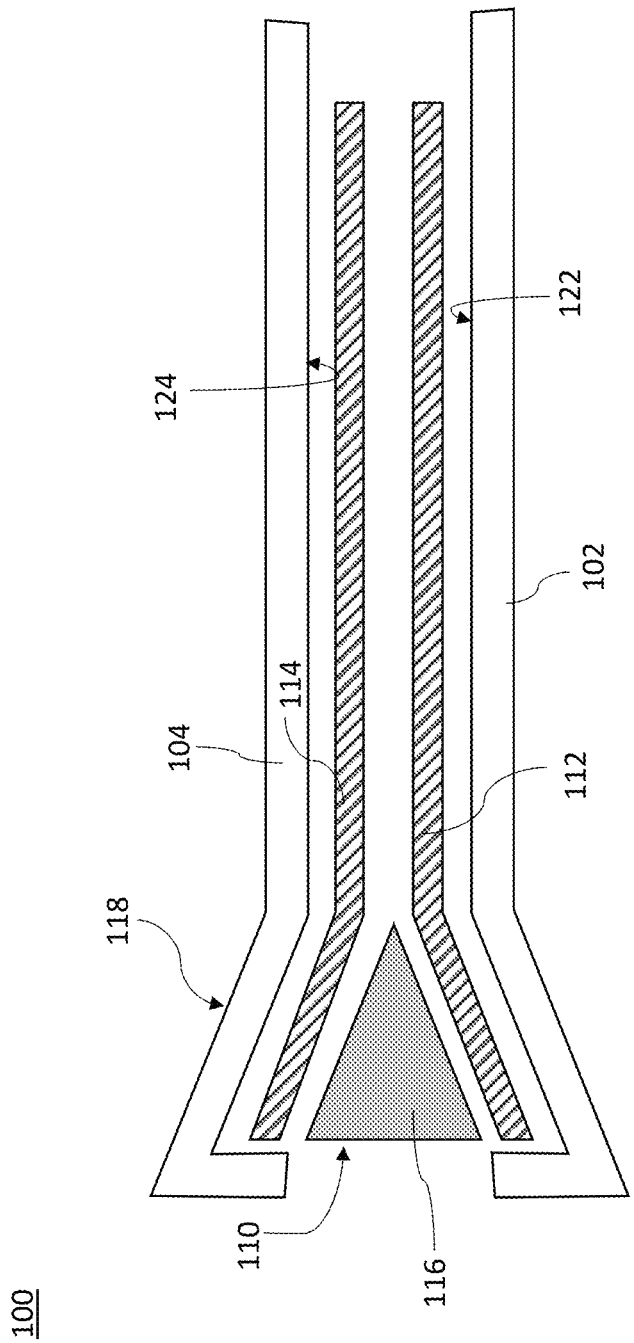
FIG. 4 schematically shows a compression mould enclosing a pre-form for a fan blade.

FIG. 4 shows a sectional view of an example mould 100 with a pre-form 110 for manufacturing a fan blade for a gas turbine engine. The mould 100 comprises a first mould part 102 having a first mould surface 122 on which the pre-form 110 is provided. In this example, the mould 100 comprises a second mould part 104 having a second mould surface 124 opposing the first mould surface 122. The first mould surface 122 and the second mould surface 124 together define an internal mould surface corresponding to the outer profile of a fan blade. In this example, the internal mould surface comprises a tapered portion at a root region 118 of the mould 100 corresponding to the root of a fan blade, by which the fan blade may be secured to a fan blade disk. In other examples, there may be no second mould part, for example the first mould surface may have a profile corresponding to the profile of one side of the fan blade.

The pre-form 110 comprises a first sub-laminate 112, a second sub-laminate 114 and a root insert 116. The first sub-laminate 112 and the second sub-laminate 114 each comprise a lay-up of fibre reinforcement material. The root insert 116 is formed in a wedge shape and comprises a fibre reinforced composite (i.e. fibre reinforcement within a matrix material such as a resin), examples of which are described below with reference to FIG. 6a-c.

The first sub-laminate 112 is provided on the first mould surface 102 and follows the contours of the first mould surface 122 (i.e. it conforms to the profile of the first mould surface). The first sub-laminate 112 and the second sub-laminate 114 have a substantially constant thickness along a longitudinal extent of the mould 100 corresponding to a longitudinal extent of the fan blade.

The wedge-shaped root insert 116 is sandwiched between the first sub-laminate 112 and the second sub-laminate 114, at a position in the pre-form 110 corresponding to the root of the fan blade.

The mould is configured so that opposing action of the first mould part 102 and the second mould part 104 towards one another applies pressure to the pre-form 110 to cause the pre-form 110 to conform to the internal mould surface (which corresponds to the outer profile of a fan blade). In other examples where there is no second mould part, a first mould part may be configured to receive a pre-form, and may be provided with a vacuum bagging apparatus and/or an autoclave to apply pressure to the pre-form on the first mould part.

Figure 5:
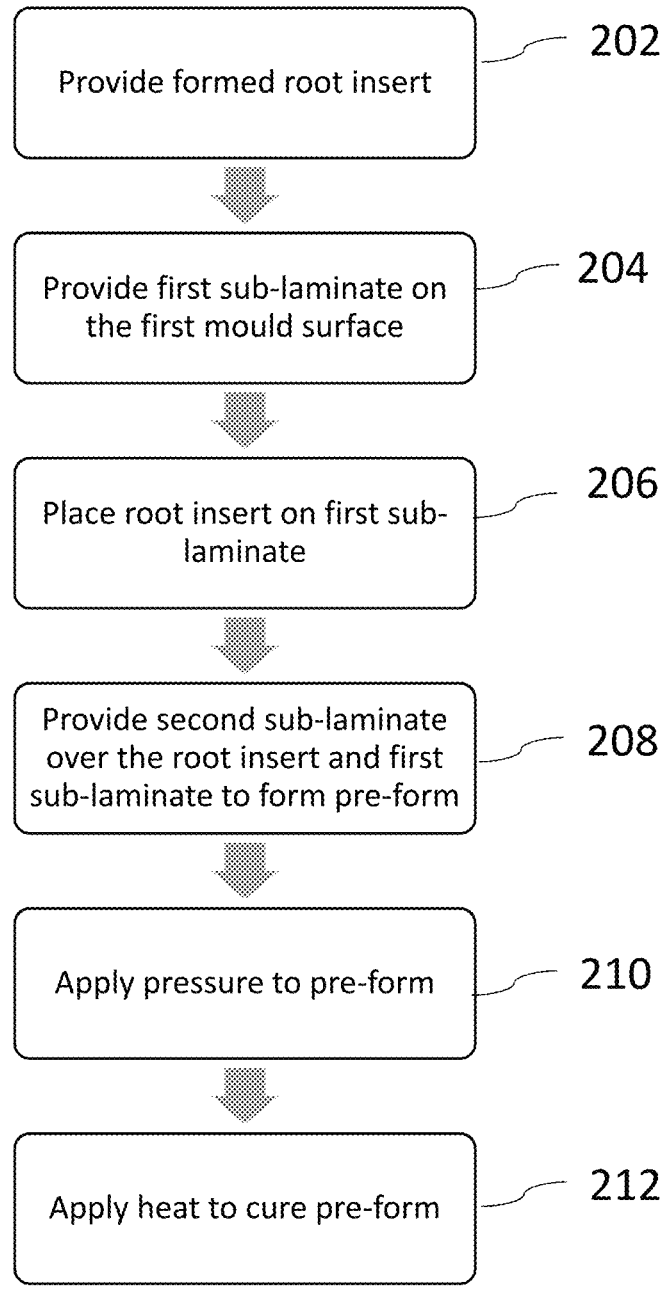
FIG. 5 is a flow chart of a method for manufacturing the fan blade.

FIG. 5 is a flow chart of an example method 200 of manufacturing a fan blade which will be described by way of example with respect to the mould 100 of FIG. 4.

In block 202 a root insert 116 is provided having a near net shape. The root insert 116 may be un-cured or partially cured. The term near net shape is intended to mean that the shape is close to the final desired shape of the root insert. In some examples, the root insert may be configured to resist deformation during subsequent forming of the pre-form, such that it substantially maintains its shape even if adjacent sub-laminates are caused to deform to conform to the profile of a mould surface, so that the outer profile of adjacent sub-laminates follows the profile of the root insert. In other examples, the root insert may be configured to flow during subsequent forming of the pre-form. In such examples, the pre-form may be provided so that the profile of the pre-form (i.e. before forming) substantially corresponds to the profile of the internal mould surface (i.e. of the formed component). Accordingly, flow of the root insert during forming may be minimized.

Figure 6A:
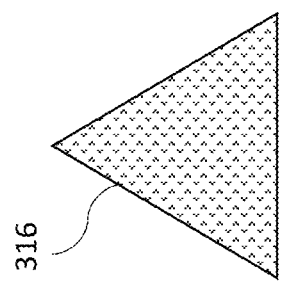
FIGS. 6a-c schematically show examples of a root inserts for use in the method of FIG. 5.
Figure 6B:
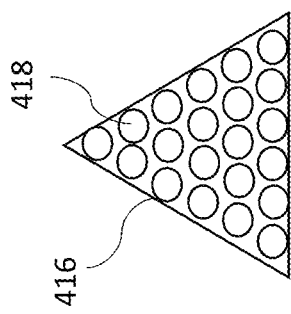
Figure 6C:
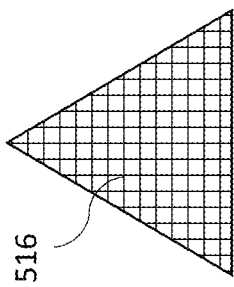

FIGS. 6a-c show examples of suitable root inserts which may be used in the example method.

FIG. 6a shows a root insert 316 comprising a quasi-isotropic short fibre reinforced resin which has been compression moulded to a wedge shape. Quasi-isotropic short fibre reinforced resin comprises a plurality of short fibres, for example carbon or glass fibres, embedded within a resin matrix. The short fibres are distributed within the matrix in a random orientation and therefore the reinforced resin material exhibits quasi-isotropic properties i.e. exhibits almost isotropic properties.

The strength of the quasi-isotropic short fibre reinforced resin is determined by the fibre volume fraction, the fibre length distribution (FLD) and the fibre orientation distribution (FOD) of the short fibres within the resin. Therefore, the material for the root insert 316 can be selected to provide a predetermined strength by selecting an appropriate fibre volume fraction, fibre length distribution and fibre orientation distribution.

FIG. 6b shows a root insert 416 comprising a bundle of coextensive fibres 418, embedded within a resin matrix, which have been pultruded in a substantially triangular profile to form a wedge shape so that each of the fibres 418 are substantially parallel to one another, and longitudinal axes of the fibres are perpendicular to the plane of the triangular profile. The root insert 416 may be positioned in the pre-form during manufacturing such that the fibres 418 extend in a chord-wise direction.

FIG. 6c shows a root insert 516 comprising fibre reinforcement material woven to provide a wedge shape.

The root inserts 316, 416, 516 of FIGS. 6a-c may be un-cured or partially cured such that they define the near net shape when provided in block 202 of the method of FIG. 5. In other examples, the root insert may be configured to retain its near net shape without requiring any curing.

In some examples, the root insert may comprise a thermoplastic composite material. Thermoplastic composite materials are not cured, but rather softened at high temperature and solidified under a controlled cooling process. In such examples, a solidified thermoplastic composite root insert may be provided in block 202 of FIG. 5.

Referring back to FIG. 5, in block 204 a first sub-laminate 112 is provided on the first mould surface 122. In this example, plies of fibre reinforcement material are laid up on the first mould surface 122 to form the first sub-laminate 112. However, in other examples, plies may be laid up elsewhere and subsequently placed on the first mould surface. In this example, the fibre reinforcement material is pre-impregnated with resin ("pre-preg"), but in other examples, the fibre reinforcement material may be dry plies of fibre reinforcement material (i.e. without resin), and resin may be transferred in a subsequent stage of the method, for example after the pre-form has been provided on the mould and before heating, as will be described below.

In block 206 the root insert 116 is placed on the first sub-laminate 112 in the root region 118 of the mould 100. The root insert 116 is sized and located within the low compressive stress region of the fan blade, as will be described in further detail below.

In block 208 the second sub-laminate 114 is provided. In this example, the second sub-laminate is placed over the root insert 116 and the first sub-laminate 112, to form the pre-form 110, so that the root is in an intermediate position between the first sub-laminate 112 and the second sub-laminate 114. In this example, the second sub-laminate 114 is provided by laying-up plies of fibre reinforcement material over the root insert 116 and the first sub-laminate 112. In other examples, the plies of fibre reinforcement material may be laid-up elsewhere and placed over the root insert and the first sub-laminate, or may laid-up or placed on the second mould surface 124 prior to assembly of the first and second mould parts. In this example, the fibre reinforcement material of the second sub-laminate 114 is pre-impregnated with resin ("pre-preg"), but in other examples, the fibre reinforcement material may be dry plies of fibre reinforcement material.

In block 210, pressure is applied to the pre-form 110 by opposing action of the first mould part 102 and the second mould part 104. This ensures that the outer profile of the pre-form 110 adopts the shape of the fan blade from the first and second mould surfaces 122, 124. In other examples, there may be no second mould part, and therefore pressure may be applied by placing the first mould part with the pre-form in a vacuum bag and applying a vacuum to the vacuum bag. The first mould part and vacuum bag may also be placed in an autoclave for additional pressure force. In yet other examples, the pre-form may be laid-up with the required fan blade profile, and so there may be no pressure applied, and block 210 may be omitted.

In some examples, the mould may additionally or alternatively be provided with a piston which is configured to engage the root insert and moveable to apply pressure to the root insert to thereby pressurize the pre-form.

In block 212, heat is applied to the pre-form 110 to cure it, for example by heating the mould 100 directly, or by placing the mould 100 in an autoclave. During heating, the root insert 116 and the first and second sub-laminates 112, 114 are fully cured together, and therefore bonded together. In examples where the root insert comprises a thermoplastic composite material, the root insert is not cured, but rather softened on heating, and then solidified in a controlled cooling process. Heating may be conducted simultaneously with applying pressure.

After forming the fan blade in the mould 100, the mould is removed. The second mould part 104 and first mould part 102 are separated to remove the mould 100 and to release the fan blade. In some examples, were there is no second mould part, and a vacuum bag has been used to apply pressure, the vacuum bag is removed to release the fan blade. The fan blade may require finishing once removed from the mould.

FIG. 7 shows a sectional view of a portion of a finished fan blade 150 after manufacturing in a process as described with reference to FIG. 5. The fan blade comprises a root 160 and a blade portion 170 extending from the root 160. The fan blade 150 comprises a root insert 156 sandwiched between a first sub-laminate 152 and a second sub-laminate 154. In this example the first and second sub-laminates have a substantially constant thickness along a longitudinal extent of the fan blade 150. The root insert 156 is positioned within the root 160 of the fan blade 150 and, at least partially, defines the tapered profile of the root 160 in that the outer profile of the root 160 is a function of the profile of the root insert 156 and the thickness of the sub-laminates. The root insert 156 is sized and positioned between the first and second sub-laminates so that the first and second sub-laminates define at least 50% of the thickness of the fan blade root, such that the root insert lies in a low compressive stress region in use.

The first and second sub-laminates 152, 154 comprise plies of fibre reinforced resin. The root insert 156 in this example comprises a quasi-isotropic short fibre reinforced resin. In other examples the root insert may comprise a bundle of pultruded fibres embedded in a resin matrix, a woven fibre reinforced resin as shown in FIGS. 6b-6c, or any non-laminated fibre reinforced composite.

Non-laminated fibre reinforced composites may be easier and faster to form than laying up plies of unidirectional fibre reinforcement material. In particular, non-laminated fibre reinforced composites may be formed in a bulk process, such as described with reference to FIGS. 6a-c, which can efficiently form the root insert in a near net shape.

An interface between the root insert 156 and first and second sub-laminates 152, 154 defines a substantially continuous interface surface 162. The bonding of the root insert 156 to the first and second sub-laminates 152, 154 may be weaker than the inter-ply bonding of the first and second sub-laminates 152, 154, or of the root insert 156 material. Accordingly, the interface surface 162 may provide a frangible delamination location at which the fan blade preferentially delaminates in a failure event. Such delamination would break the root 160 of the fan blade 150 into smaller fragments in a failure event, which fragments may be more readily contained by a fan blade containment of a gas turbine engine. As a bulky and high inertia component, impact of the root portion of a fan blade on a fan blade containment may correspond to a peak loading condition for the containment. Accordingly, by configuring the root portion to preferentially delaminate, a peak loading condition of the containment may be reduced, and therefore the strength (and thereby the weight) of the containment may be reduced.

In other examples, there may be a plurality of root inserts in the root portion, with adjacent root inserts separated by an intermediate sub-laminate. By providing a plurality of root inserts, the root may be configured to preferentially delaminate at a plurality of delamination locations to further reduce the size of delaminated portions of the root portion.

Laying up plies is a time consuming process which is often done manually or otherwise requires significant control procedures to be defined. By replacing a portion of a lay-up with a root insert as described herein, the time taken and manual/control effort to manufacture a fan blade may be considerably reduced without adversely affecting blade performance. There may be a trade-off between the manufacturing efficiency benefits and the overall strength of the fan blade when cured, as the root insert and the interface surface between the root insert and the first and second sub-laminates may have a lower strength than the sub-laminates.

The applicant has found that stress patterns in a fan blade are such that high stress regions are generally located towards a surface of the fan blade, and lower stress regions are located towards the core. Therefore, in this example, the root insert, first sub-laminate and second sub-laminate are sized such that the sub-laminates each define at least 50% of the total root thickness through the root of the fan blade.

The applicant has therefore found that the manufacturing of a fan blade can benefit from the efficiencies of using a bulk root insert in the root of a fan blade without compromising structural integrity of the fan blade under normal operating conditions.

Further, the use of a root insert as described herein to provide the root thickness for a fan blade enables the manufacture of simple sub-laminates which can be subsequently formed into shape—for example sub-laminates that are of substantially uniform thickness (at least in the root region where they are to lie adjacent the root insert) rather than a complex lay-up of plies to build up a tapered root. This simplifies and accelerates the deposition of the material for the entire fan blade. Furthermore, the use of the root insert as described may reduce manufacturing defects which may arise in areas of numerous laid-up plies when they are formed under pressure, or otherwise reduce the burden to monitor and control a lay-up procedure to avoid such defects.

Yet further, using a root insert as described herein may reduce the cost of the fan blade, as the material cost of a quasi-isotropic short fibre reinforced resin material, for example, may be lower than uni-directional fibre reinforcement plies.

Although it has been described that the fan blade comprises a single root insert, in other examples, the fan blade may comprise more than one root insert, with each root insert separated from an adjacent root insert by a further sub-laminate.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A method of manufacturing a fan blade for a gas turbine engine, the method comprising:
providing a root insert comprising non-laminated fibre reinforced composite;
providing a first sub-laminate of a fibre-reinforcement pre-form for the fan blade on a first mould surface;
placing the root insert on the first sub-laminate at a position corresponding to a root of the fan blade;
providing a second sub-laminate of the pre-form over the root insert and the first-sub-laminate; and
applying heat and pressure to form and cure the pre-form, wherein
the root insert defines an overall shape of a root portion of the fan blade less a thickness of the first sub-laminate and a thickness of the second sub-laminate,
the fan blade includes a gas-washed portion and a root portion, and
the root insert does not extend into the gas-washed portion.

2. The method according to claim 1, wherein the root insert is formed by compression moulding quasi-isotropic short fibre reinforced resin.

3. The method according to claim 1, wherein the root insert is formed by pultrusion of a bundle of fibres.

4. The method according to claim 1, wherein the root insert is formed by weaving a plurality of fibres.

5. The method according to claim 1, wherein the root insert is wedge shaped.

6. The method according to claim 1, wherein providing the first sub-laminate comprises laying up of plies of fibre reinforcement material on the first mould surface.

7. The method according to claim 1, wherein providing the second sub-laminate comprises laying up of plies of fibre reinforcement material over the root insert and the first sub-laminate.

8. The method according to claim 1, wherein the first sub-laminate and the second sub-laminate are provided with a substantially constant thickness along a longitudinal extent of the pre-form.

9. The method according to claim 1, wherein the root insert and first and second sub-laminates are sized and positioned in the layup, such that the first sub-laminate and second sub-laminate each define 50% of the total thickness through the gas-washed portion of the fan blade.

10. The method according to claim 1, wherein the pre-form is compression moulded.

11. The method according to claim 1, comprising providing more than one root insert comprising non-laminated fibre reinforced composite.

12. The method according to claim 1, wherein the root insert is un-cured or partially cured when placed on the first sub-laminate, and wherein the root insert is fully cured together with the first and second sub-laminates.

13. A fan blade for a gas turbine engine, comprising
a root insert sandwiched between a first sub-laminate and a second sub-laminate within a root of the fan blade, wherein
the root insert comprises non-laminated fibre reinforced composite,
the first and second sub-laminates each comprise laminated fibre reinforced composite,
the root insert defines an overall shape of the root of the fan blade less a thickness of the first sub-laminate and a thickness of the second sub-laminate,
the fan blade includes a gas-washed portion, and
the root insert does not extend into the gas-washed portion.

14. The fan blade according to claim 13, wherein the root insert comprises quasi-isotropic short fibre reinforced resin.

15. The fan blade according to claim 13, wherein the root insert comprises a woven pattern of fibre reinforcement material.

16. The fan blade according to claim 13, wherein the root insert comprises a bundle of coextensive fibres in a resin matrix.

17. The fan blade according to claim 13, wherein the root insert defines a wedge shape.

18. The fan blade according to claim 13, wherein the first and second sub-laminates each have a substantially constant thickness along a longitudinal extent.

19. The fan blade according to claim 13, wherein an interface between the root insert and sub-laminates defines a frangible delamination location at which the fan blade is configured to preferentially delaminate in a failure event.

\* \* \* \* \*